(12) United States Patent
Babej

(10) Patent No.: US 7,594,421 B2
(45) Date of Patent: Sep. 29, 2009

(54) BOLT ELEMENT HAVING A SHAFT PART AND A SPHERICAL HEAD, COMPONENT ASSEMBLY AND METHOD FOR THE MANUFACTURE OF A BOLT ELEMENT

(75) Inventor: Jiri Babej, Lich (DE)

(73) Assignee: PROFIL Verbindungstechnik GmbH & Co., KG, Friedrichsdorf (DE)

( * ) Notice: Subject to any disclaimer, the term of this patent is extended or adjusted under 35 U.S.C. 154(b) by 463 days.

(21) Appl. No.: 11/419,105

(22) Filed: May 18, 2006

(65) Prior Publication Data

US 2006/0204325 A1 Sep. 14, 2006

Related U.S. Application Data

(62) Division of application No. 10/250,451, filed on Dec. 12, 2003, now Pat. No. 7,048,463.

(51) Int. Cl.
*B21J 15/32* (2006.01)

(52) U.S. Cl. .................. 72/466.5; 72/465.1; 29/525.06

(58) Field of Classification Search .............. 72/465.1, 72/466.4, 466.5, 391.2, 391.4, 391.6; 29/525.05, 29/525.06, 243.53; 411/502, 503
See application file for complete search history.

(56) References Cited

U.S. PATENT DOCUMENTS

| | | | | |
|---|---|---|---|---|
| 2,349,341 A | * | 5/1944 | Disse | 72/466.5 |
| 4,218,911 A | * | 8/1980 | Johnston | 72/479 |
| 4,569,111 A | * | 2/1986 | Mutou | 29/283.5 |
| 6,883,223 B2 | * | 4/2005 | Edwards | 29/525.06 |

* cited by examiner

*Primary Examiner*—Edward Tolan
(74) *Attorney, Agent, or Firm*—Hershkovitz & Associates, LLC; Abraham Hershkovitz; Eugene Rzucidlo

(57) ABSTRACT

Bolt element (10) having a shaft part (12) which is designed at a first end (14) for a rivet connection (16) to a panel element (18), in particular to a sheet metal part, is characterized in that the shaft part (12) has a spherical formation (22) at its other end (20) the ball diameter (D) of which is larger than that of the shaft part (12). In this manner a bolt element with a spherical head can be manufactured in an extremely favourable manner price-wise and it can be ensured that the spherical head has no burr which would lead to the wearing of the socket provided in operation which slides on the spherical head.

7 Claims, 7 Drawing Sheets

Figure 1:
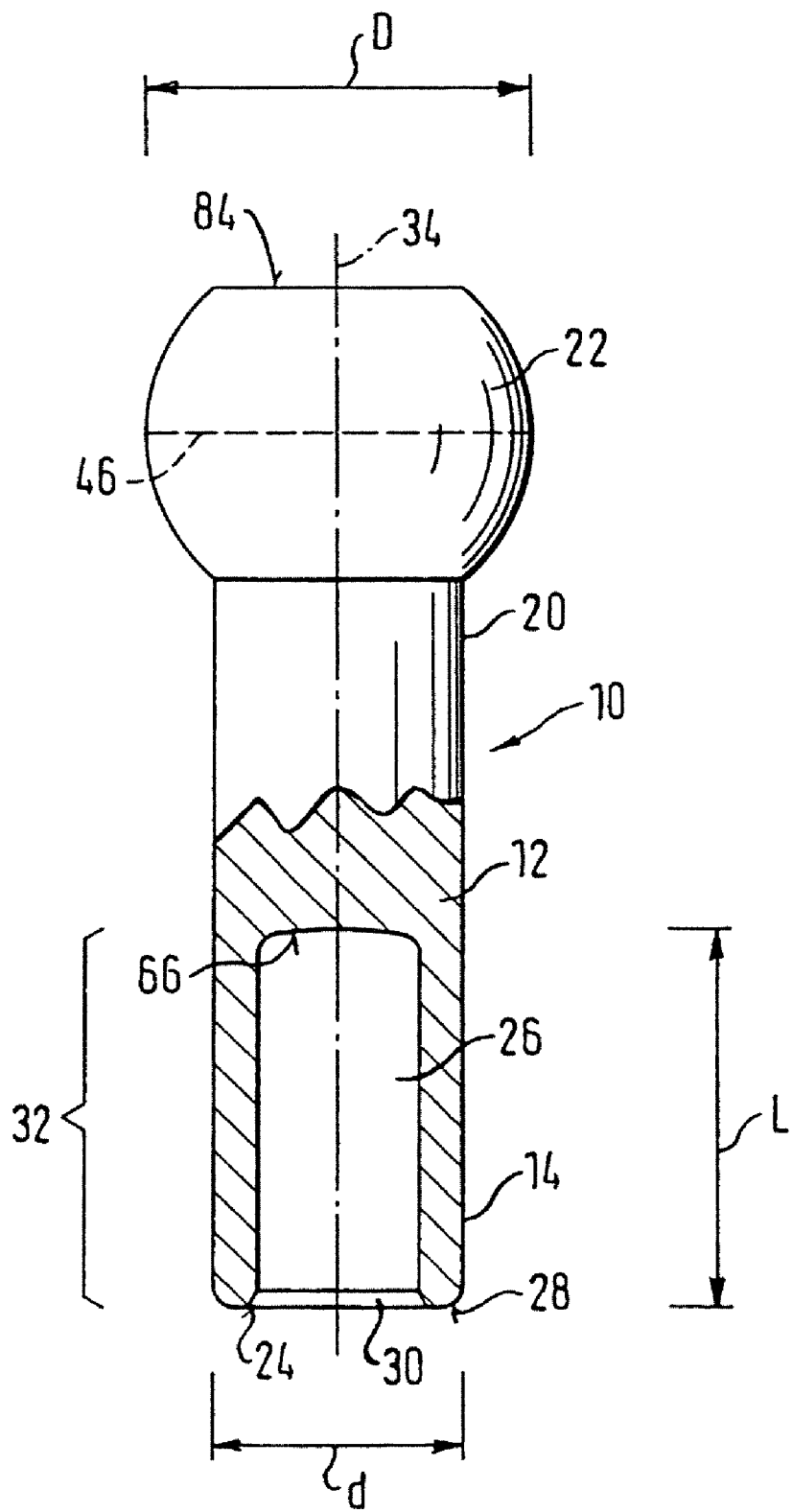

BOLT ELEMENT HAVING A SHAFT PART AND A SPHERICAL HEAD, COMPONENT ASSEMBLY AND METHOD FOR THE MANUFACTURE OF A BOLT ELEMENT

CROSS REFERENCE OF APPLICATION

This application is a divisional application of U.S. patent application Ser. No. 10/250,451, filed Dec. 12, 2003 now U.S. Pat. No. 7,048,463 which claims the benefit of priority under 35 U.S.C. §119 from PCT/EP01/15370 filed on Dec. 28, 2001 and from German Patent Application No. 10065670.6, filed on Dec. 29, 2000, the contents of all of which are incorporated herein by reference.

The present invention relates to a bolt element having a shaft part which is designed at a first end for a rivet connection to a panel element, in particular to a sheet metal part. Furthermore, it relates to a component assembly comprising a bolt element of this kind with a component as well as to a method for the manufacture of such a bolt element.

A bolt element of the initially named kind is known from the International Application PCT/EP00/06465 or from the corresponding German Patent Application 100 33 149.1 as well as from the International Application PCT/EP00/06468 and from the corresponding German Patent Application 100 22 152.1.

One problem in mechanical engineering is to manufacture favourably priced bolt elements with a spherical head. Such bolt elements are for example used as hinge elements for damped spring supports which are used to support boot lids or bonnets (hoods) of motor cars. Such hinge elements are however also found in a plurality of other constructions, for example in linkages in the actuation mechanism of carburettors and the like.

The known spherical bolt elements have a thread at the shaft part and a flange projecting radially from the thread so that the bolt element can be fixedly installed on a sheet metal part or carrier. This design of the shaft part of the bolt element also makes it difficult to manufacture the spherical head because it gives rise to restrictions in the design of the cold heading tools for the spherical head.

In the known bolt elements for the spherical head it is problematic that when these are to be manufactured at favourable cost as cold headed parts the movable tool parts which form the spherical head have to move radially towards the longitudinal axis of the bolt elements and that burrs form at the surface of the spherical head at the partition surfaces, i.e. where these tool parts meet one another, with the burrs each lying in a radial plane. These burrs, even if they are fine in nature must either be removed in a costly manner in a further process or one was must accept the disadvantage that the burrs relatively quickly lead to wear of the socket which receives the spherical head, irrespective of whether the socket consists of plastic or metal.

The object of the present invention is to provide a bolt element with a spherical head which can be manufactured at extremely favourable cost and nevertheless does not have any disturbing burr. Moreover, a favourably priced attachment of a bolt element to a component should be made possible, so that the corresponding component assembly can likewise be obtained at a favourable price. Furthermore, a favourably priced method for the manufacture of a corresponding bolt element is to be provided.

In order to satisfy this object a bolt element of the initially named kind is provided with the special characterizing feature that the shaft part has at its other end a spherical formation, the ball diameter of which is larger than that of the shaft part.

In other words the bolt element in accordance with the invention consists essentially of a spherical head and a cylindrical shaft part, which is hollow at its end remote from the spherical head in order to enter into a rivet connection with a panel element, in particular with a sheet metal part. Since the diameter of the shaft part is constant, the functional element can be manufactured in that a cylindrical blank is received partly in a cylindrical passage of a die and projects beyond the end face of the die, in that a hemispherical recess is formed in the die in the region of the transition of the passage into the end face with the ball diameter of the hemispherical recess corresponding to the ball diameter of the desired spherical formation of the bolt element, in that a tool with a likewise hemispherical recess is pressed onto the free end of the cylindrical blank projecting out of the die and the die and the tool are brought into contact with one another in order to reshape the end of the cylindrical blank projecting out of the die to the spherical formation by cold deformation.

Whereas, in the prior art, the cold heading tools which are used for the manufacture of the spherical head have to be moved in the radial direction relative to the longitudinal axis of the corresponding blank in the invention the tools, of which there are only two, namely the die and the tool which cooperates with it, are, so to say, arranged coaxially to the cylindrical blank and are moved towards one another in order to produce the spherical formation by cold deformation of the cylindrical blank. This signifies that in the closed state of the die and of the tool, i.e. when these contact one another at a partition surface this partition surface is located at a position which corresponds to an equator of the spherical formation and stands perpendicular to the longitudinal axis of the cylindrical blank or of the shaft part of the bolt element.

In this design it is on the one hand possible to guide the die and the tool in such a way that they are strictly aligned relative to one another and that only an extremely small burr is formed in the region of the equator, if at all. This burr is however also no longer so disturbing because it does not exert any pronounced scraping action on the socket on rotating the socket about the longitudinal axis of the spherical head, as is the case of a burr which extends in a radial plane. Because the shaft part of the functional element is made at least substantially cylindrical and has a constant outer diameter, the cylindrical blank can be made at extremely favourable cost from cylindrical bar material or wire or can be manufactured from tube material. A radial movement of the parts of the die or of the tools in order to take account of the features of shape of the shaft parts is no longer necessary, since no such features of shape are present in a purely cylindrical shaft part.

Through the design of the rivet connection in accordance with the manner described in the above-named PCT applications, or in the corresponding German patent applications, it is nevertheless possible to secure the corresponding bolt element at favourable cost and with adequate strength to a component or to a sheet metal part.

In the first case (in the case of PCT/EP00/06465) the bolt element has a form designed there as a head part in the shape of a hollow cylinder which is equipped with piercing and riveting features and which is introduced in a self-piercing manner into a sheet metal part. In this arrangement the free end of the hollow head part is formed over to a rivet bead at one side of the sheet metal part and the wall of the cylindrical part is formed into a ring fold at the other side of the sheet metal part, so that the sheet metal part is clamped between the rivet bead and the ring fold. In this way a stable connection arises between the bolt element and the sheet metal part.

In the second case (in the case of the PCT Application PCT/EP00/06468) the bolt element likewise has a section termed there as the head section which is again formed as a hollow cylinder but which is strongly rounded at its open end face and thus has in total a cigar-like shape.

In both cases the respective element has an at least substantially constant diameter over its entire length in preferred embodiments.

In the case of the cigar-like element this is not introduced in self-piercing manner into the sheet metal part, but rather the hollow region of the bolt element is exploited to press the sheet metal part into a shaping space of a die and is deformed during this into two axial ring folds spaced from one another by a ring recess with the sheet material being pressed into the ring recess and thus producing a stable rivet connection between the bolt element and the sheet metal part. The shaft parts of the respective bolt elements are normally provided with an outer thread. Other formations, such as a peripherally extending groove to receive a spring clamp are also described. The disclosures of the above designated international applications or of the corresponding German applications are also made part of the content of the present application since the designs respectively described there, for the rivet connections to the sheet metal part, can be used in identical form in the present invention and represent preferred embodiments of the rivet connection which will be used for the present invention.

In both cases the deformation of the hollow region of the shaft part at its first end remote from the spherical head leads to an adequately broad ring fold which enables a good attachment to the sheet metal part and so to say forms a broad base so that forces which act in the radial direction on the spherical head do not lead to a loosening of the bolt element.

Particularly preferred embodiments of the bolt element and also of the component assembly, of the method and also of the die and tools in accordance with the present invention can be taken from the description of the Figures and also from the subordinate claims.

Figure 2:
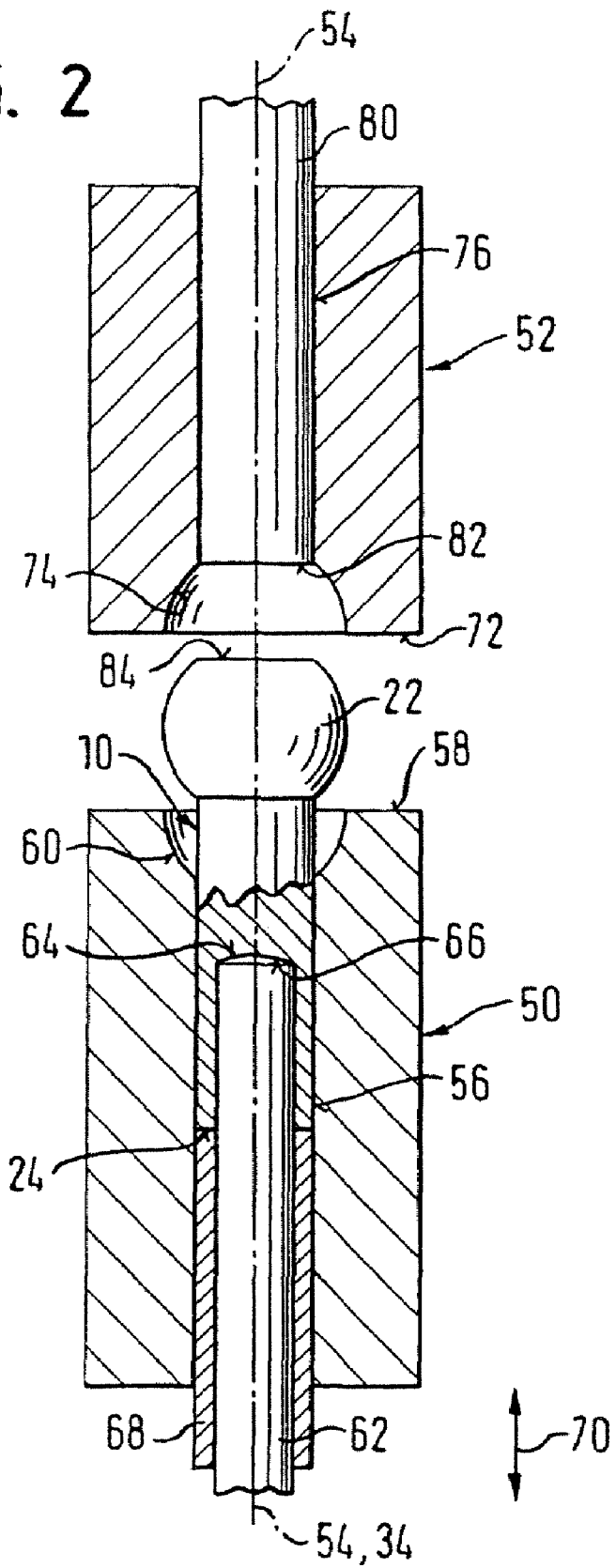
Figure 3:
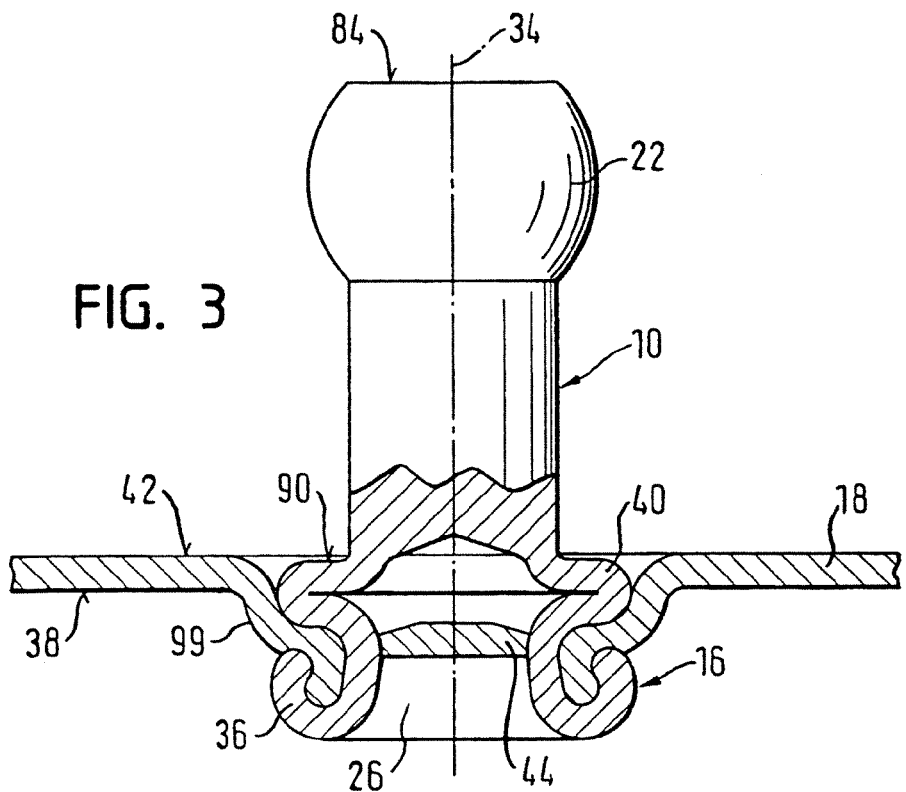
Figure 4:
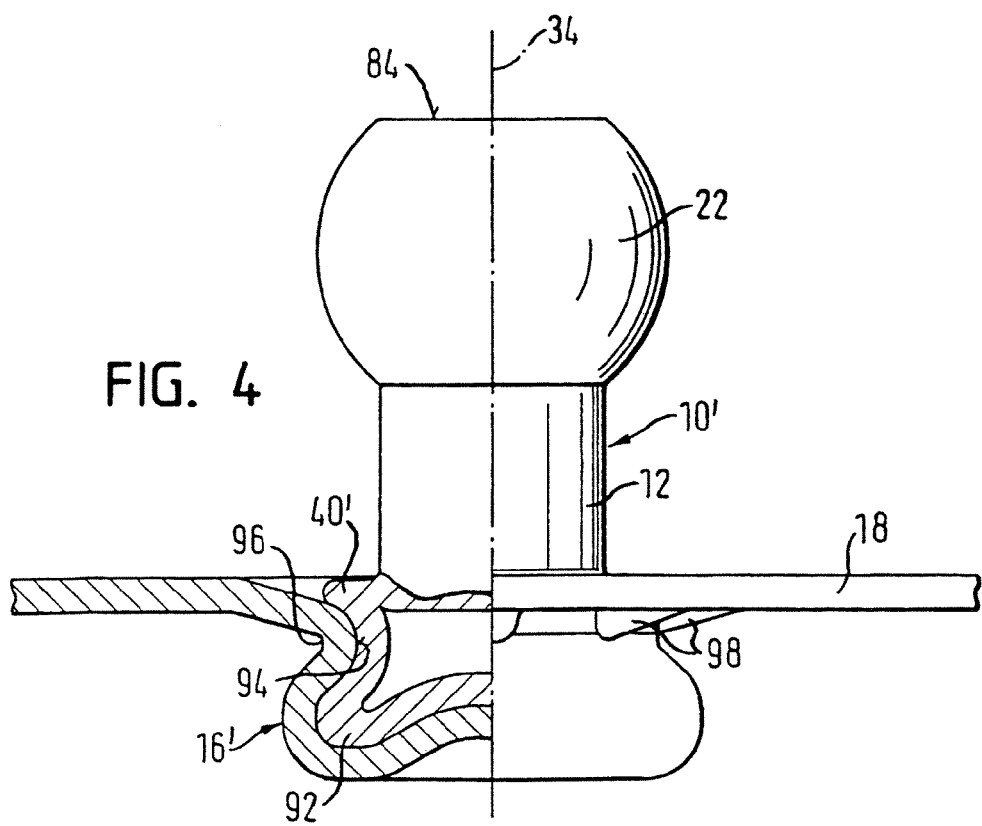
Figure 5:
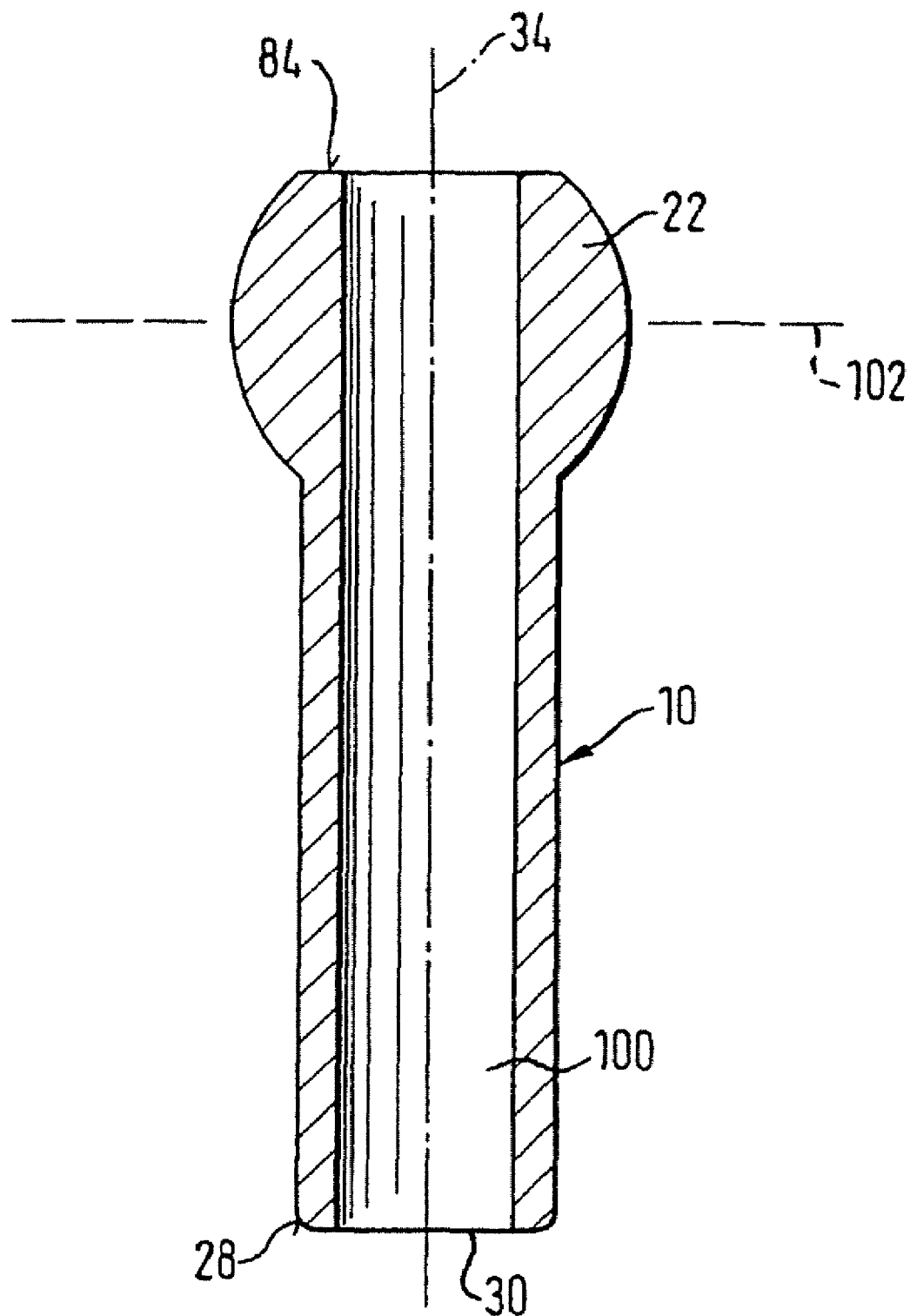
Figure 6:
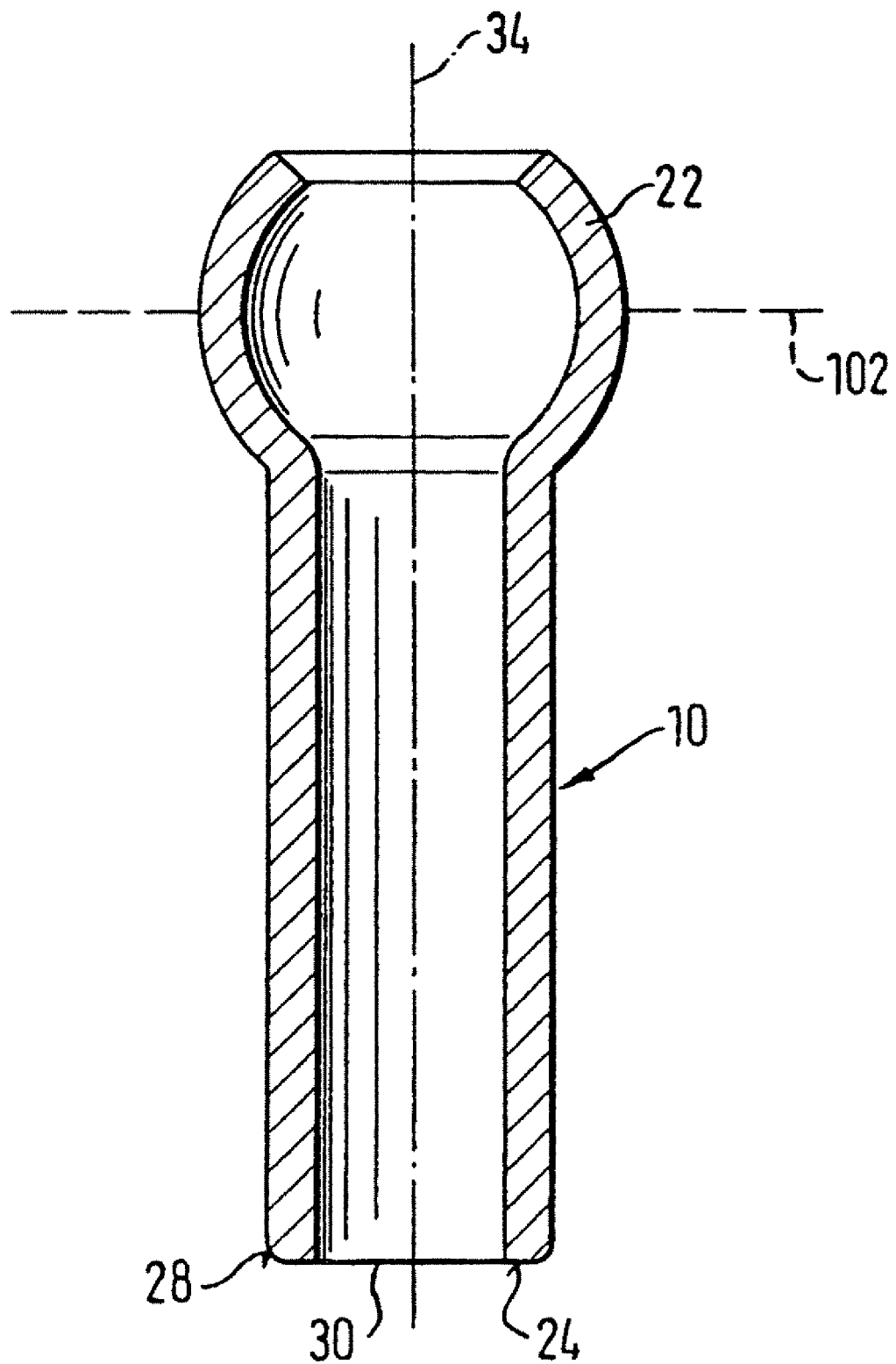
Figure 7:
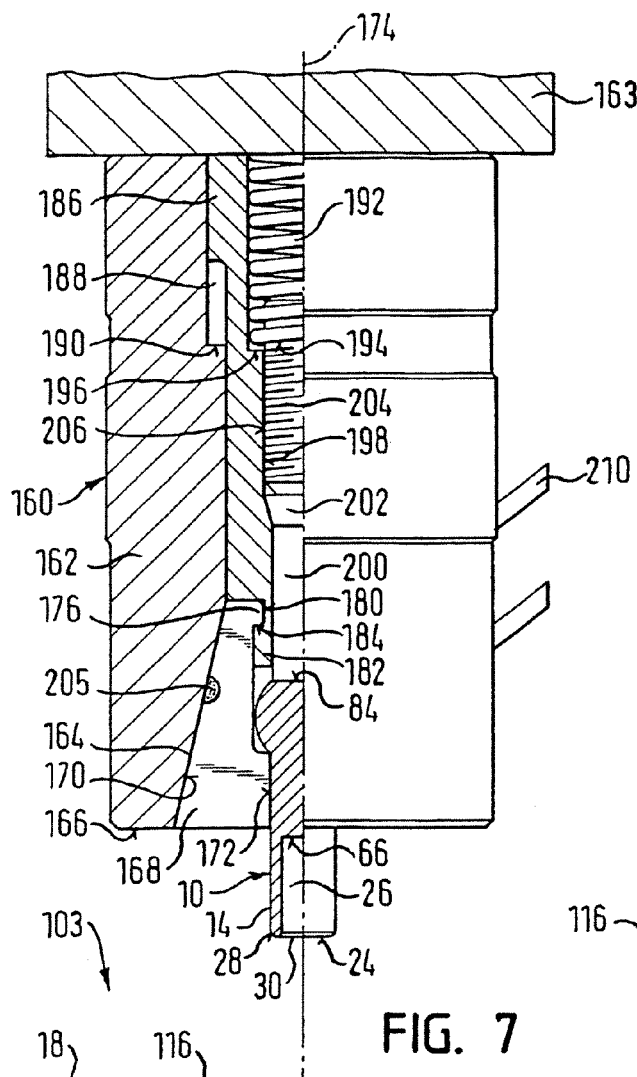
Figure 8:
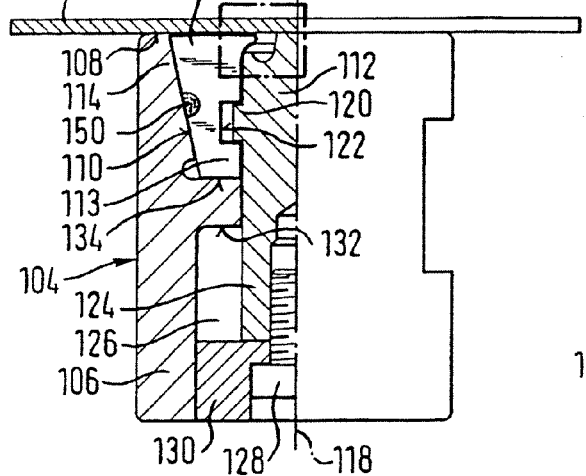
Figure 8:
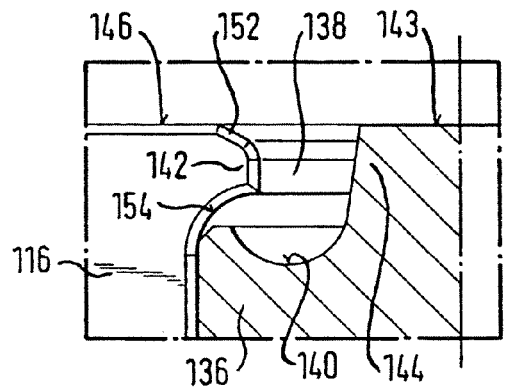
Figure 9:
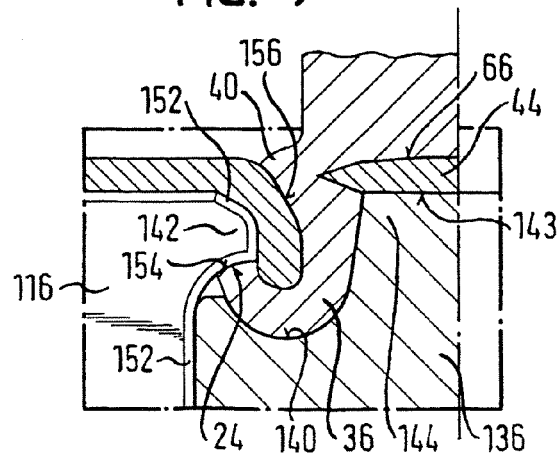

The invention will now be explained in more detail with reference to embodiments and to the drawing in which are shown:

FIG. 1 a bolt element in accordance with the invention sectioned partly in the longitudinal direction, FIG. 2 the tools used in accordance with the invention for the manufacture of the bolt element of the invention of FIG. 1, FIG. 3 a diagram corresponding to FIG. 5 of the PCT Application PCT/EP00/06465 in order to explain the attachment of the bolt element of the invention to a sheet metal part, FIG. 4 a Figure corresponding to FIG. 2 of the PCT Application PCT/EP00/06468 in order to show the use of the rivet connection of this PCT Application in the present invention, FIG. 5 a representation sectioned in the longitudinal direction of a spherical bolt element, which was manufactured from tube material, FIG. 6 a similar illustration to that of FIG. 6 of a spherical bolt element which was manufactured by means of an internal high pressure forming process, FIG. 7 a preferred tool for the attachment of spherical bolt elements, FIG. 8 a detail of the die of FIG. 7 in the region of the rectangle drawn in there without sheet metal part, FIG. 9 the detail of FIG. 8 after the attachment of the spherical bolt element and FIGS. 10A to 10D a series of sketches to illustrate different possible sheet metal preparation steps.

In the following description the same reference numerals will always be used for the same or similar parts and features, so that a description which has been given once of a part or of a feature also applies to a part or feature with the same number and the description need not be repeated.

FIG. 1 shows in a side-view a bolt element 10 in accordance with the invention and having a shaft part 12 which is designed at a first end 14 for a rivet connection 16 (see FIG. 3) to a panel element 18 together with a sheet metal part. The shaft part 12 has at its other end 20 a spherical formation 22, the ball diameter D of which is larger than the diameter d of the shaft part.

The diameter d of the shaft part 12 is at least substantially constant over at least substantially its whole length from the spherical formation 22 up to the end face 24 of the first end 14.

The first end 14 of the shaft part 12 which is designed for the rivet connection 16 to the sheet metal part is made hollow and has at least substantially the same outer diameter d as the remainder of the shaft part 12. The hollow space 26 which is formed in this way is, as shown in FIG. 1, at least substantially of circularly cylindrical shape. The first end 14 of the shaft part 12 is formed in a manner known per se with piercing and riveting features, and indeed in the form of a rounded punching and drawing edge 28 and has a conical cutting surface 30 at its inside. The piercing and riveting section of the bolt element 10 is thus formed in accordance with DE-PS 34 470 06 C2. The outer periphery of the shaft part 12 is preferably also made circularly cylindrical, i.e. it has in cross-section a circular periphery. It would however also be conceivable to use shapes of the shaft part 12 which differ slightly from the circular shape, for example a polygonal shape should this appear expedient for special reasons.

The hollow region 32 should have a minimum length L (measured in the direction of the central longitudinal axis 34 of the bolt element 10) to ensure that adequate material is present in the hollow region in order, during the formation of the rivet connection 16 of FIG. 3, to form the rivet bead 36 at the side 38 of the component 18 remote from the spherical formation 22, to bridge the thickness of the component 18 and to form the ring fold 40 at the side 42 of the component 18 adjacent the spherical formation.

It is also conceivable to make the bolt element hollow as a whole which would have the advantage that the element could be manufactured from tube material and that the spherical formation could be manufactured by a high pressure shaping process inside a corresponding outer die.

When using a hollow shaft part this can optionally be provided with an internal thread whereby, after formation of the rivet connection of FIG. 3 and removal of the stamping slug 44 shown there, a bolt could be introduced into the thread from the end of the bolt element 10 remote from the spherical formation 22 in order to additionally enhance the attachment to the sheet metal part, should this be necessary. A bolt element of this kind could also increase the stiffness of the bolt element itself. With such a design (not shown) it will be necessary to provide correspondingly shaped washers for a stable seating of the head of the bolt at the underside of the sheet metal part 18 for which it would be sufficient, under such circumstances, to provide the rivet bead 36 with a flattened lower side (in FIG. 3) by a pressing process.

It is moreover evident from FIG. 1 that the spherical formation 22 has an equator line 46 which lies in a plane which stands perpendicular to the longitudinal axis 34 of the shaft part. At the position of the equator line 46 there is essentially no burr, i.e. no raised portion to be found during the manufacture of the bolt element, but rather this equator 46 merely shows the position of the parting joint of the tools which are used to form the spherical formation. These tools are shown in more detail in FIG. 2. They comprise a lower die 50 and an upper tool 52. The designation "lower" and "upper" relates here, as also at other points of the description and claims solely to the alignment of the drawing and does not represent any restrictions on the actual alignment of the die or of the tool. These parts could just as easily be arranged so that the die is disposed above the tool 52 or such that the central longitudinal axis 54 is arranged horizontally or in another direction.

The die 50 has a cylindrical passage 56 which merges, in the region of the end face 58 of the die, into a hemispherical recess 60 the spherical diameter of which corresponds to the diameter D of the spherical formation 22 of the bolt element 10. Within the central passage 56 of the die there is located a cylindrical bar 55, the upper end 64 of which is located in the hollow space 26 of the bolt element 10 and, for example, contacts the transverse wall 66 of the hollow space 26. At its other, lower, end the bar 62 is supported on a firm support, as is the die 50. The bar 62 is located within a sleeve 68 which can be moved to and fro in accordance with the double arrow 70 in order to eject the finished bolt element 10 out of the die.

Above the die 50, and coaxially aligned with it, is a tool 52 which likewise has a hemispherical recess 74 at its end 70, with this hemispherical recess 74 also merging into a circularly cylindrical passage 76 which is likewise arranged coaxial to the central longitudinal axis 54. The reference numeral 80 points in this embodiment to a cylindrical guide which is located in the passage 76 and the lower end 82 of which serves to produce the flat 84 at the upper end of the spherical formation 22. This guide 80 can also be biased with a spring device so that it can deflect by a small amount if, for tolerance reasons, too much material is present for the generation of the spherical formation 22.

The manner of operation of the arrangement in accordance with FIG. 2 will now be explained in more detail. Inititally all the bolt element 10 should be imagined to be missing. First of all a cylindrical blank (not shown) which has the hollow space 26 and the piercing and riveting features is introduced into the central passage 56 of the die 50 so that the transverse wall 66 is supported on the upper side of the bar 54. The ejection sleeve 68 is retracted in this state so that the lower end face 24 of the blank has a distance from the sleeve 68 or can press this away with a light contact pressure. The upper die 52 is now guided downwardly under the guidance of the guide bar 80 and deforms the upper end of the cylindrical blank into the spherical form 22. At the end of the movement of the tool 52 towards the die 50 the lower end face 72 of the tool 52 is in contact with the upper end face 58 of the die 50 and the partition joint, i.e. the position at which the end faces 72 and 58 contact one another, is so selected that it lies on the equator line 46 of the spherical formation. The cylindrical blank is so dimensioned that it projects prior to the closing movement of the tool 52 against the die 50 beyond the end face 58 of the die 50 and indeed by an amount such that just sufficient material is present in order, in the closed state of the tools, i.e. with contact of the end face 72 of the tool 52 against the end face 58 of the die 50 to fill out fully the so formed spherical space.

As soon as the tools have reached this closed position the bolt element is finished, the tool 52 is moved upwardly again and away from the die 50 and the sleeve 68 is moved upwardly in order to eject the finished bolt element 10, as shown in FIG. 2, out of the die 50. Thereafter a new cylindrical blank can be inserted into the passage 56 and the method is repeated in order to manufacture a further bolt element.

The die 50 can be arranged in this manufacturing process and the lower tool of a press, whereas the upper tool 52 is attached to the upper tool of the press or to an intermediate platen of the press.

The method for attachment of the bolt element 10 to a sheet metal part 18 as shown in FIG. 3 is described in detail in the above-mentioned PCT Application PCT/EP00/06465 and will not be explained here in further detail because the precise nature and design of the rivet connection is not the subject of the present invention. Since the lower end of the bolt element 10 is equipped with piercing and riveting features it can be introduced in self-piercing manner into the sheet metal part 18, whereby the punching slug 44 arises. As shown in FIG. 3 this punching slug is clamped into the deformed hollow space 26 of the bolt element 10 and contributes to the stability of the rivet connection 16. The upper side 90 of the ring fold 40 is so arranged that it lies approximately in the same plane as the upper side 42 of the sheet metal part 18 and it does not therefore present any obstacle for the freedom of movement of a socket placed onto the spherical formation 22. One can see from the shape of the (originally flat) sheet metal part in the region of the rivet connection 16 how an extremely stable attachment of the bolt element 10 to the sheet metal part 18 is provided.

The bolt element 10 need not essentially be executed as shown in FIG. 1 but rather other designs of the first end 14 are conceivable which are also suitable for a rivet connection to a sheet metal part. In particular a design can be considered as shown in FIG. 2 of the PCT Application PCT/EP00/06468. This design also enables a rivet connection 16' as shown in FIG. 4 and is likewise realized as set forth in the mentioned PCT Application. Advantageous for this type of rivet connection is the fact that the sheet metal part 18 is not pierced, so that a water-tight connection is present. As can be read in the corresponding PCT Application the rivet connection 16' is effected here in such a way that the hollow region of the bolt element is formed into two ring folds and indeed an upper ring fold 40' and additionally a lower ring fold 92 which form a ring-like recess 94 between them. The sheet metal material is pressed into this ring-like recess 94 by the attachment of the sheet metal element, as shown at 96 in FIG. 4, and is firmly clamped between the two ring folds 40' and 92. The reference numeral 98 points in this example to noses providing security against rotation which are important in the PCT Application if the corresponding element has to take up torques about the longitudinal axis.

Since one is concerned here with a bolt element with a spherical head, which does not have to take up any torques, such noses 98 providing security against rotation are not compulsory and the corresponding features of shape of the tools which are necessary to form theses noses providing security against rotation can be omitted.

In all embodiments all materials can be named as an example for the material of the functional elements which achieve the strength values of class 8 in the accordance with the Iso standard in the context of cold forming, for example a 35B2 alloy in accordance with DIN 1654. The so formed fastening elements are suitable, amongst other things, for all commercially available steel materials for example drawing quality sheet metal parts and also for aluminium or other alloys.

FIG. 5 shows an axial cross-section through a spherical bolt element 10 similar to the spherical bolt element 10 of FIG. 1 but with the difference that the element was manufactured from tube material and thus has a through-going central passage 100 with a circular cross-section. The lower end of the element of FIG. 5 can be formed in correspondence with the lower end of the bolt element of FIG. 1 with piercing and riveting features in the form of a rounded pressing and drawing edge 28 and a conical cutting surface 30, is however shown here in an embodiment in which the conical cutting surface 30 was reduced to a minimum, which is also possible. The lower end of the longitudinal passage 100 corresponds to the hollow space 26 of the spherical bolt element 10 of FIG. 1 or forms this hollow space.

The spherical bolt element 10 is manufactured in accordance with the spherical bolt element 10 of FIG. 1 in a tool corresponding to FIG. 2 but with the difference, that the guide bar 80 is preferably provided with a cylindrical projection (not shown) which fits into the central longitudinal passage 100 of the tubular blank or of the spherical bolt element and extends downwardly approximately to the upper end of the guide bar 62 in order to support the tube material from the inside during the formation of the spherical head and to avoid undesired deformations of the tube material. The step between the bar 80 and the downwardly directed cylindrical process, which also serves as a guide spigot and is introduced into the central longitudinal passage of the element forms a radial shoulder which takes care of the flattening 84 at the upper end of the spherical head.

FIG. 6 shows an alternative design of a spherical bolt element 10 which is manufactured of tube material. In this case a circularly cylindrical tube section is laid into a two-part die (not shown) which has the outer shape of the finished spherical bolt element of FIG. 6 as a hollow cavity. The lower end 24 in FIG. 6 of the spherical bolt element 10 is supported against a transverse wall of a hollow cavity of the mould and hydraulic fluid is forced at high pressure into the interior of the tube section via the upper end of the tube section in FIG. 6 by means of a suitable nozzle, so that the spherical shape of the spherical head is produced by the high pressure applied to the inner side. The two-part mould, which is not shown, but which is formed in the region of the spherical bolt elements in accordance with the tool 52 and the die 50 has a partition surface between the two halves of the mould at the level of the plane 102 which is shown in FIG. 6. After formation of the spherical bolt element 10 the mould is opened and the spherical bolt element can be moved from the mould, optionally with the aid of a slider which slides in the axial direction of the shaft part of the spherical bolt within one of the form halves and preferably presses against the lower end face 24 of the spherical bolt element 10 in FIG. 6.

FIG. 7 shows a preferred tool 104 for the attachment of a spherical bolt element, for example in accordance with FIG. 1, to a plate-like work-piece in the form of a sheet metal part 18. The sheet metal part 18 is supported on the upper end face of a die 104 which, in its basic principles resembles the dies of the European Patent Application 99 120 559.2 and of the European Patent Application 00 931 155.6. In accordance with FIG. 9 of the first named patent application the die 104 which is present here has a hollow body 106 with an end face 108 provided for the support of a sheet metal part merging via a conically tapering wall 110 into a space having an abutment element 112, with the abutment element 112 being spaced from the conically tapering wall for the formation of a ring gap 113 which is wedge-like in cross-section.

In the wedge-like ring gap there are a plurality of segment-like shaped parts of the same design, for example from 1 to 8, in particular 4 shaped parts 116 which are arranged around the longitudinal axis 118 of the die in the wedge-like ring gap 113 and are supported both at the conical wall 110 and also at the abutment element 112. The shaped parts 116 can either be so arranged that they completely fill out the ring gap 113 around the longitudinal axis 118, i.e. so that no structure is present between neighbouring shaped parts 116, for example in accordance with FIG. 10 of the EP Application 99 120 559.2, or fixed structure of the die can be provided between the adjacent shaped parts of the die, as in the die of EP Application 00 931 155.6 or of the earlier related die of the same inventor.

The abutment element is however designed in this embodiment somewhat differently than in the named EP applications.

First of all it is evident that the abutment element 112 has a ring-like, radially extending, collar 120 which engages into corresponding grooves 122 of the shaped parts, with the abutment element 112 being movable with the shaped parts in the axial direction 118 of the die 104. The lower end 124 of the abutment element projects into a hollow space 126 of the die body 106 and is terminated there with a disk element 130 screwed on by means of a screw 128. In this hollow space 126 there is a compression coil spring between the radially inwardly projecting shoulder 132 of the outer part of the die and the die 130, with the compression coil spring being designed to draw the abutment element 112 downwardly and also the shaped parts 116 with the abutment element 112 via the ring-like collar 120 the maximum downward movement of the shaped parts is bounded by the upper side 134 of the ring shoulder against which the shaped parts enter into contact. This also restricts, via the collar 120 and the grooves 122, the lowest possible position of the abutment element 122. The upper end 136 of the abutment element 122, which can be seen in enlarged form in FIGS. 8 and 9, forms a shaping space 138 for the tubular end 14 of the spherical bolt element 10. This ring-like shaping space has a rolling surface 140 of semicircular shape in cross-section in its base region which is arranged significantly below the radially inwardly projecting noses 142 of the shaped parts 146. The end face 143 of the central post 144 of the abutment element lies flush with the upper side 146 of the shaped parts in FIG. 8, which in turn lies flush with the upper side of the outer part 106 of the die 104 and of the tool (not shown), which accommodates the die.

The reference numeral 150 points to a ring spring element which holds the shaped parts to the abutment element.

As evident from FIG. 8 the shaped parts have rounded edges 152, which is evident from the double line execution.

Whereas, in the die, in accordance with the PCT Application PCT/EP00/06468 the sheet metal part is shaped into a pot-like recess during the stamping of the corresponding element into a shaping space of the die, the central post 144 cooperates with the piercing and riveting features 28, 30 of the lower end of the spherical bolt element 10 in order to punch out from the sheet metal part a punching slug 44 similar to the manner described for the shaping die of the German Patent DE-PS 34 47 006.

The lower end face 24 of the spherical bolt element punches through the sheet metal part 18 in collaboration with the upper end 143 of the central post of the abutment element 12 and draws the sheet metal part around the hole which is formed in this way over the rounded noses 142 of the shaped parts into the shaping space 138 of the die. At the same time the material of the tubular end of the spherical bolt element 10 is deflected radially outwardly, and then upwardly again, by the rolling surface of the abutment element of the die until the free end 24 of the spherical bolt element 10 abuts against the underside 154 of the radially inwardly projecting noses 142 of the shaped parts 116.

One can see from FIG. 9 that the conical shape 156 of the sheet metal part 18 in the shaping space 130 of the die now lies in form-fitted manner within the turned over end 14 of the spherical bolt element 10 and in that at least essentially the entire shaping space 138 is full of metal. As soon as this position is achieved the material of the spherical bolt element can no longer flow into the shaping space 138, the length of the tubular collar is however so dimensioned that the previously mentioned ring fold 40 can form, which is shown in FIG. 9. The movement of the free end 24 of the spherical bolt element is effectively stopped at the lower side 154 of the noses of the shaped parts 116, so that the ring fold 40 can now be formed.

One notes that the punching slug 44 which arose on punching through the sheet metal part is trapped between the upper end 143 of the central post 144 and the transverse wall 66 inside the hollow space 26 and there stiffens the connection to the sheet metal part.

During opening of the press after the punching in of the spherical bolt element 10 the spherical bolt element is first lifted and simultaneously lifts the sheet metal part to which it is now attached, out of the die. In doing so the shaped parts 116 jointly lift upwardly, together with the abutment element 112, with the coil spring in the hollow space 126 being compressed until the forces which act in the region of the rivet bead 36 are sufficient to press the shaped parts 116 radially outwardly away from the rivet bead 36, whereby the component assembly consisting of the spherical bolt element 10 and the sheet metal part 18 are freed from the die 104.

The upper part 160 of the tool 104 of FIG. 7 represents a setting head which is designed for the attachment of the spherical bolt element such as 10 to the sheet metal part 18 and for this purpose can be attached via a holder, not shown, to an upper tool 163 of a press or to an intermediate platen of a press or, in an inverse arrangement, to a lower tool of the press.

The setting head 160 is aligned here in order to achieve a central alignment of the spherical bolt element with the die and prevents a kinking of the bolt element when it is stamped into place. The die ensures a termination of the beading operation when the free end face 24 of the rivet bead 36 runs against the die insert, i.e. against the shaped parts 116 and thus a defined starting point for the bulging out of the shaft 16 for the formation of the ring flange 40 and indeed even when only one shaped part 116 is provided, which is fundamentally possible with a die construction similar to the EP application 00 931 155.6.

The setting head 160 has an outer tubular part 162 with a conical recess 164 at the lower end 166 in which, in turn, a plurality of shaped parts, for example four shaped parts 168, are accommodated of which only the one shape part 168 is visible in FIG. 7. The shaped parts each have a conical outer wall 170 which is made complementary to the conical wall 164 of the outer part 162 of the setting head 160.

In the lower region of the shaped parts in FIG. 7 these have radially inwardly extending jaw faces 172 which engage on the shaft part 14 of the spherical bolt element 10 and are formed as part-cylindrical surfaces so that an areal contact at the spherical bolt element is possible, in order to ensure the required alignment of the spherical bolt element 10 with the central longitudinal axis 174 of the setting head, which stands coaxial to the central longitudinal axis 118 of the die.

In the upper region the shaped parts 168 have radially inwardly directed noses 176 which extend into a groove 180 in a displaceable sleeve 182 of the setting head 160. The lower boundary 184 of the groove engages behind the noses so that the shaped parts 168 are compulsorily guided, i.e. axially movable with the sleeve 182.

A ring spring 184 surrounds the shaped parts 168 and thus ensures that the shaped parts 168 are not lost. The sleeve 182 has in its upper region a radially outwardly directed collar 186 which is movable in a circularly cylindrical hollow space 188 of the outer part 162 of the tool 160, with a radially inwardly directed ring shoulder 190 of the outer part 162 of the tool 160 bounding the hollow cavity 188 at the bottom and forming an abutment for the radially outwardly directed collar 186 of the sleeve 182.

Within the upper region of the sleeve there is located a light compression coil spring 192, the lower end 194 of which contacts a radially inwardly directed shoulder 196 of the sleeve 182 and the upper end of which in FIG. 7 is braced against the upper tool 163 of the press. In this embodiment the spring thus lightly biases the sleeve in the direction radially downwardly.

A plunger pin 200 with a conical upper end 202 is located within a cylindrical bore 198 of the sleeve 182 in the lower region of the sleeve and is supported against a corresponding conical surface within the displaceable sleeve 182, so that the plunger pin 200 cannot fall downwardly out of the sleeve 182. Above the plunger pin 200 there is a grub screw 204 which is screwed into a threaded bore 206 of the displaceable sleeve to prevent the plunger pin 200 deviating upwardly. The screw connection between the grub screw 204 and the sleeve 182 ultimately also transmits the pressure forces, which coming from the upper tool 163 of the press, press the sleeve 182 and thus also the grub screw 204 and the plunger pin 200 downwardly. One can see that the plunger pin 200 comes into contact on the flat 84 at the upper end of the spherical bolt element 10.

On closing the press the spherical bolt element cannot deflect upwardly and the downwardly directed forces lead to the above described piercing of the sheet metal part and also to the shaping of the lower end 14 of the spherical bolt element 10 and the formation of the ring fold 40. When these shaping operations are concluded the lower end 16 of the upper tool 160 contacts the sheet metal part 18 and presses the latter against the lower tool in the form of the die 104.

On opening of the press the upper tool 160 lifts the spherical bolt element 10 with the attached sheet metal part 18 out of the die so that the die releases the component assembly, as described above. The sheet metal part then strikes against other parts of the press (not shown) so that a downwardly acting force is exerted on the spherical bolt element. The spherical bolt element thus pulls the shaped parts partly out of the outer part of the upper tool to such an extent that the outwardly extending collar 186 comes into contact with the radially inwardly directed ring shoulder 190. This axial movement is sufficient in order to release the spherical head from the shaped parts 168 since these can deflect radially outwardly when they are partly pulled out of the outer part of the upper tool. In order to favour this radially outwardly directed movement the shaped parts 168 have in the region of the axial upper ends of the jaw surfaces 172 inclined faces or shaped faces 208 which cooperate with the rounded spherical surface of the spherical head of the spherical bolt element.

The component assembly comprising the spherical bolt element and the sheet metal part can now be removed from the working area of the tool in accordance with FIG. 7.

Since the compression coil spring holds the shaped parts in the opened position a new spherical bolt element can be introduced from below into the upper tool and pressed upwardly (until the jaw surfaces 172 of the shaped parts again engage the shaft part 14 of the spherical bolt element 10 and the compression coil spring is compressed. The ring spring 205 which, for example consists of polyurethane and which presses the shaped parts 168 towards one another is made sufficiently strong to hold the sleeve 182 with the shaped parts 168 in the position shown in FIG. 7 by friction at the conical wall 164. The new spherical bolt element now adopts the position of the spherical bolt element 10 of FIG. 7.

A new sheet metal part 18 can now be introduced into the press and, as described previously, the new spherical bolt element can then be riveted to the new sheet metal part 18.

Instead of inserting the bolt element from below, for example by hand, between the shaped parts or shaped segments 168 of the upper tool the spherical bolt elements 10 can be introduced in an automated embodiment through an obliquely aligned guide channel 210 into the space between the shaped parts.

If for example three shaped parts 168 are provided, the obliquely aligned guide passage can lead into the intermediate space between two of the segment-like shaped parts 168. This makes it possible for the spherical bolt element 10 to move from the obliquely aligned position of the guide passage 210 into the vertically aligned position between the shaped parts 168. A similar procedure is however also possible if the tool 160 is provided with four contacting shaped parts 168, providing the necessary space for the guide passage 210 can be created.

Figure 10A:
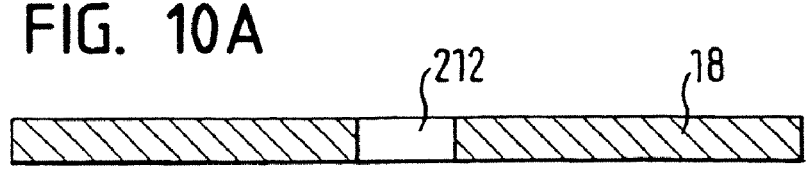

The series of sketches 10A, 10B, 10C and 10D finally show that it is also possible to insert the spherical bolt element into thicker pieces of sheet metal. With sheet metal of approximately 1.5 mm thickness it is sufficient to pierce the sheet metal part 18 or, as is shown in FIG. 10A, to pre-form a hole as at 212.

Figure 10B:
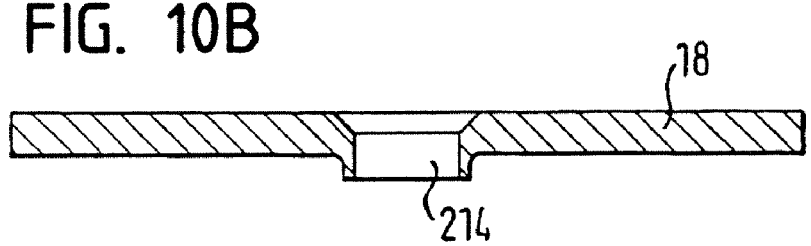
Figure 10C:
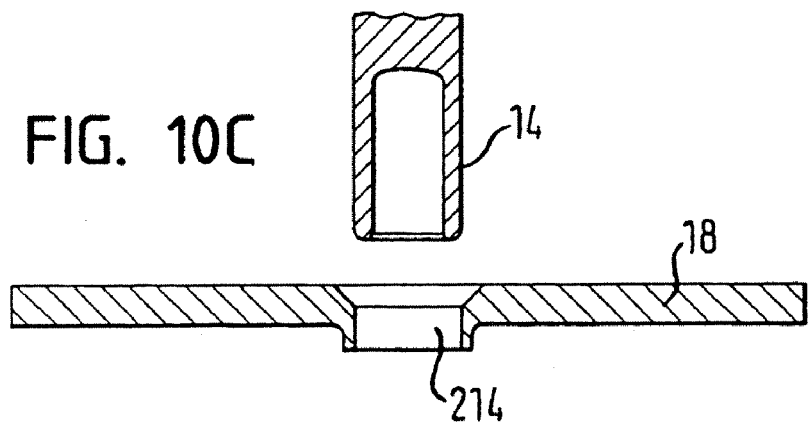
Figure 10D:
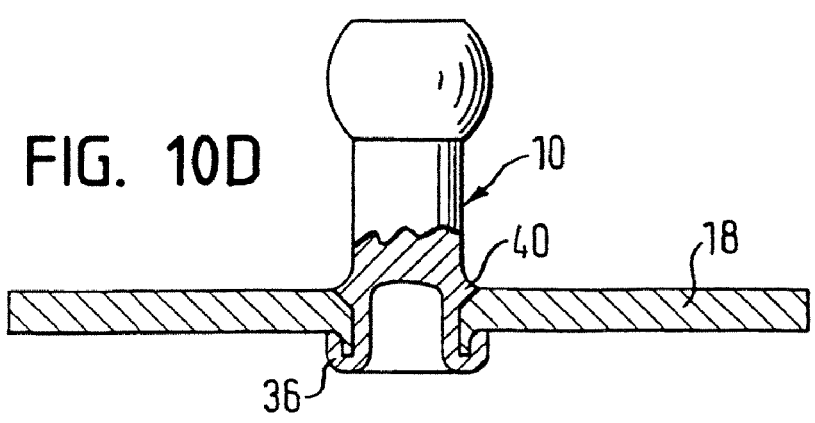

For sheet metal thicknesses beyond 1.5 mm it is however favourable to carry out a sheet metal preparation step so that the sheet metal has the shape of FIG. 10B in the region of the hole 214. A sheet metal preparation of this kind is for example described in connection with the so-called clamping hole riveting process (European Patent 539 793) and in connection with the so-called EBF elements in the PCT Application PCT/EP96/04188, which is why it is not repeated here. FIG. 10C shows that the inner diameter of the hole 215 corresponds during the preforming of the hole and preparation of the sheet metal part at least substantially to the outer diameter d of the lower end 14 of the spherical bolt element. FIG. 10D finally shows the position after the attachment of the element which is executed according to the PCT Application PCT/EP00/06465.

The possibility also exists of using the die of FIG. 7 to attach the bolt element into the prepared sheet metal part, with no punching slug arising here because the sheet metal part is not pierced by the spherical bolt element. The installation situation presents itself similarly to that of FIG. 10D except that a nip is present between the beaded over end 24 of the rivet bead 36 and the sheet metal part which is produced by the noses 142 of the shaped parts 106 of the die 104.

The invention claimed is:

1. A riveting die for the attachment of a bolt element to a sheet metal part having a tubular rivet section at one end thereof, having a central abutment element having a central post and a concavely rounded rolling surface surrounding said central post, a plurality of shaped parts surrounding said central abutment element and abutting against it, there being a shaping space formed between said shaped parts and said abutment element adjacent said central post and said rounded rolling surface, with said rounded rolling surface forming a base of said shaping space, said shaped parts having radially inwardly directed noses forming a sidewall of said shaping space, and said noses having lower sides which serve as abutment surfaces for the end face of said tubular rivet section of the bolt element.

2. A riveting die in accordance with claim 1, wherein said riveting die has a conical recess, said conical recess having a longitudinal axis with said abutment element being arranged at least partially in said conical recess coaxial to said longitudinal axis, wherein said shaped parts have a respective outer wall portion complementary in shape to said conical recess, said shaped parts surrounding said abutment element and disposed to be axially movable within said conical recess.

3. A riveting die in accordance with claim 2, wherein said conical recess has a conically tapering wall and said shaped parts being supported during a riveting action both at said conically tapering wall and also at said abutment element.

4. A riveting die in accordance with claim 3, wherein a groove is provided in said outer wall portion of said shaped parts, with a ring spring element engaging in said groove, said ring spring element holding said shaped parts to said abutment element.

5. A riveting die in accordance with claim 3, wherein said abutment element has a collar which engages into corresponding grooves in inner walls of said shaped parts.

6. A riveting die in accordance with claim 1, wherein said shaped parts are arranged directly alongside one another.

7. A riveting die in accordance with claim 1, wherein a disk element is provided adjacent an end of said abutment element remote from said central post said disk element terminating a hollow space at an end of said die remote from said shaped parts, wherein a compression coil spring is provided in said hollow space.

* * * * *